United States Patent Office 2,994,626
Patented Aug. 1, 1961

2,994,626
LOW LOSS BATTERY
Paul Ruetschi, Glenside, Pa., assignor to The Electric Storage Battery Company, a corporation of New Jersey
No Drawing. Filed Oct. 27, 1958, Ser. No. 769,591
6 Claims. (Cl. 136—154)

The present invention relates to improvements in storage batteries of the lead-sulphuric acid type. More particularly, the present invention is concerned with lead-sulphuric acid type batteries having electrodes containing antimony in the grid alloy.

In lead-sulphuric acid storage batteries, it is customary to employ an alloy of lead and antimony for the grids or supporting structures for the active material of the positive and negative electrodes, the antimony being included in the grid alloy to strengthen the alloy and to make it easier to cast. It has been observed, however, that antimony tends to leach out of the positive grid during formation and deposit on the negative electrode. In addition, antimony also tends to dissolve from the negative electrode during the pasting and setting steps of electrode manufacture, further contaminating these electrodes. This antimony causes a self-discharge of the negative electrode which is commonly called "local action." As a result of local action, a standard automobile battery will lose approximately 25% of its capacity in 4 weeks when stored at a temperature of 95° F.

It is an object of the present invention to reduce or minimize the local action resulting from the contamination of the negative plate with antimony.

Another object of the present invention is to provide means for increasing the length of time during which the battery can be stored in a wet charged condition without a trickle charge or recharge.

It is possible to produce batteries with very small stand loss by using antimony-free grid alloys, but pure lead grids are difficult to cast and are too soft to be handled efficiently. While lead grids may be strengthened by the addition of calcium to the alloy, such grids are considerably more expensive and, in addition, are difficult to cast. It is, therefore, highly desirable to provide another means of reducing self-discharge in lead-sulphuric acid batteries.

Accordingly, it is a further object of the present invention to provide a new and improved additive for addition to the electrolyte of a lead-sulphuric acid storage battery which will increase the shelf life of a battery by reducing self-discharge.

In accordance with one embodiment of the present invention, there is introduced into the electrolyte of the lead-sulphuric acid storage battery having grids containing antimony, an aromatic aldehyde such as anisaldehyde, or its oxidation and reduction products such as anisalcohol or anisic acid. It has been found that the addition of this material has a marked effect in reducing the local action and consequently a loss of capacity of a battery while standing on open circuit. The aromatic aldehydes have the effect of stimulating the formation of stibine gas, the hydride of antimony, and, thereby, rids the cell of excess free antimony, thus, reducing local action and loss of capacity of the battery on stand. In accordance with another embodiment of the present invention, there is introduced into the electrolyte of a lead-sulphuric acid storage battery a small quantity of an aromatic aldehyde in combination with cadmium sulphate. The aromatic aldehyde and the cadmium sulphate act in combination to promote the production of stibine gas and, thus, reduce self-discharge to a minimum.

Other objects and advantages of the present invention will be apparent from the following description of preferred embodiments thereof.

In carrying out one form of the present invention, there is added to the electrolyte of a lead-sulphuric acid type storage battery during the formation of the battery, an aromatic aldehyde such as anisaldehyde or its oxidation and reduction products such as anisalcohol or anisic acid. These substances are added in concentrations of from about 1 to 10 grams per liter of electrolyte acid. The effect of these substances is to promote the evolution of stibine gas. This is accomplished by their absorption in the negative plate which has the effect of increasing the hydrogen overvoltage of that plate, and hence, the production of stibine, the hydride of antimony. The formation of stibine gas tends to rid the cell of free antimony, thus making the antimony unavailable for local action or self-discharge.

The addition of the aromatic aldehyde to the battery electrolyte may also be made by adding these substances to the refill electrolyte after initial formation. Still further, it has been found that optimum results are achieved when the aldehyde is added to the electrolyte in amounts ranging from 4 to 6 grams per liter of electrolyte. Smaller quantities will produce some reduction in local action and quantities exceeding 10 grams per liter produce very little additional improvement.

In carrying out another form of the present invention, there is added to the electrolyte of a lead-sulphuric acid type storage battery either during formation or to the refill electrolyte after initial formation, an aromatic aldehyde in combination with cadmium sulphate. The aromatic aldehyde is added in concentrations of from about 1 to 10 grams per liter of electrolyte acid and the cadmium sulphate is added in the same concentrations. It has been found that the combination of the aromatic aldehyde and cadmium sulphate provides the most effective electrolyte additive for reducing local action. As mentioned hereinbefore, the addition of the aromatic aldehydes to a battery electrolyte increases the hydrogen overvoltage of the negative electrode. The amount of this increase in negative plate hydrogen overvoltage is from about 0.1 to about 0.25 volts at the end of formation with conventional current rates. The addition of the cadmium sulphate tends to counteract this increase in hydrogen overvoltage and, in addition, still promotes the efficient production of stibine gas at the negative electrode.

It has been found that optimum reduction of local action is achieved when the aromatic aldehyde is added to the electrolyte in amounts of 4 to 6 grams per liter and the cadmium sulphate is added to the electrolyte in similar amounts. Still further, it has been found that these additives tend to decrease slightly the cold temperature performance of the battery. However, the decrease in cold rate performance is not serious, generally being much less than 10 percent. It has been also found that, when considering the reduction in battery cold rate performance and in the light of reduction of local action, that the combination of anisaldehyde and cadmium sulphate is the preferred combination of electrolyte additives.

The effect of local action in a lead-acid battery having antimony in the grid alloy may be determined by measuring the drop in the specific gravity of the electrolyte during an open circuit stand, which is a measure of the loss of battery capacity. In order to demonstrate the resulting reduction in the local action in a battery having plates with grids of a lead-antimony alloy during an open circuit stand when an electrolyte additive in accordance with the present invention is present, the following tests were made. Six commercial batteries having grids of a lead-antimony alloy and identical in every respect, were selected and identified as batteries A, B, C, D, E, and F. To the electrolyte of each of these batteries, additives according to the present invention, were mixed in the amounts indicated in the table below:

| Battery | Additive | Amount, grams/liter |
|---|---|---|
| A | None | |
| B | Anisaldehyde | 5 |
| C | Anisalcohol | 5 |
| D | Anisic Acid | 5 |
| E | Cadmium Sulphate | 10 |
| F | Anisaldehyde-$CdSO_4$ | 5 |

During the tests, the six batteries were subjected to identical treatment, that is, they were charged in series for the same length of time and maintained at a constant temperature of 95° F. After bringing the batteries to a fully charged condition, the specific gravity in each of the cells was determined. After a stand on open circuit of 4 weeks or 672 hours, the specific gravity of the electrolytes were again taken. These figures deducted from the original value gave the drop in specific gravity during the stand due to local action. The results of these tests are tabulated below:

Battery:                            Specific gravity drop
- A _____ .035
- B _____ .026
- C _____ .027
- D _____ .028
- E _____ .028
- F _____ .021

From the results of these tests, it will be observed that the local action of each of the batteries having a single electrolyte additive according to the present invention exhibited a specific gravity loss of approximately 20% less than that of the untreated battery. It should also be noted that the battery treated with the anisaldehyde showed he least specific gravity drop. Battery E, the battery treated with cadmium sulphate alone, also showed a specific gravity loss of approximately 20% less than that of the untreated battery. The best performance, however, was obtained from the battery where the combination of anisaldehyde and cadmium sulphate were each added in amounts of 5 grams per liter of electrolyte. Thus, this test shows that the combination of anisaldehyde and cadmium sulphate provides better results than can be obtained when either additive is used alone. This fact is true regardless of the amount of either additive used. It should be noted that this test was carried on under severe conditions in that local action is known to occur at a higher rate at elevated temperatures.

Having described the present invention, what is claimed as new is:

1. An electrolyte for a lead-acid storage battery having lead-antimony alloy grids comprising a dilute solution of sulphuric acid having incorporated therein a compound selected from the group consisting of anisaldehyde, anisalcohol and anisic acid in an amount ranging from about 1 to 10 grams per liter of electrolyte.

2. An electrolyte for a lead-acid storage battery having lead-antimony alloy grids comprising a dilute solution of sulphuric acid having incorporated therein a compound selected from the group consisting of anisaldehyde, anisalcohol, and anisic acid in an amount ranging from about 4 to 6 grams per liter of electrolyte.

3. An electrolyte for a lead-acid storage battery having lead-antimony alloy grids comprising a dilute solution of sulphuric acid having incorporated therein anisaldehyde in an amount ranging from 4 to 6 grams per liter of electrolyte.

4. An electrolyte for a lead-acid storage battery having lead-antimony alloy grids comprising a dilute solution of sulphuric acid having incorporated therein a compound selected from the group consisting of anisaldehyde, anisalcohol and anisic acid in an amount ranging from about 4 to 6 grams per liter of electrolyte and cadmium sulphate in an amount ranging from about 1 to 10 grams per liter of electrolyte.

5. An electrolyte for a lead-acid storage battery having lead-antimony alloy grids comprising a dilute solution of sulphuric acid having incorporated therein a compound selected from the group consisting of anisaldehyde, anisalcohol, and anisic acid in an amount ranging from about 4 to 6 grams per liter of electrolyte and cadmium sulphate in an amount ranging from about 4 to 6 grams per liter of electrolyte.

6. An electrolyte for a lead-acid storage battery having lead-antimony alloy grids comprising a dilute solution of sulphuric acid having incorporated therein anisaldehyde and cadmium sulphate both present in amounts ranging from about 4 to 6 grams per liter of electrolyte.

References Cited in the file of this patent

UNITED STATES PATENTS

| 581,283 | Harris | Apr. 27, 1897 |
| 692,507 | Edison | Feb. 4, 1902 |
| 2,582,845 | Murphy | Jan. 15, 1952 |

FOREIGN PATENTS

| 6,954 of 1903 | Great Britain | Feb. 25, 1904 |

OTHER REFERENCES

Transactions of Electrochemical Society, vol. LXIX, 1936, pages 115–129.